United States Patent [19]

Boston

[11] 4,073,070
[45] Feb. 14, 1978

[54] COLORING BOOK FOR THE BLIND

[76] Inventor: Jacquelin Vaughan Boston, 1101 Palmer Road, Oxon Hill, Md. 20022

[21] Appl. No.: 790,969

[22] Filed: Apr. 26, 1977

[51] Int. Cl.² ............................................. G09B 11/04
[52] U.S. Cl. ...................................... 35/26; 35/35 A; 273/DIG. 27
[58] Field of Search .................. 35/26, 35 A, 35 E, 36, 35/37, 38, 41; 273/DIG. 27

[56] References Cited

U.S. PATENT DOCUMENTS

| 716,629 | 12/1902 | Dodge | 35/37 |
| 882,463 | 3/1908 | Griggs | 35/26 |
| 2,371,153 | 3/1945 | Connelly | 35/26 |
| 2,754,370 | 7/1956 | Gauvreau | 35/35 A X |
| 2,964,858 | 12/1960 | Rutherford | 35/26 X |

FOREIGN PATENT DOCUMENTS

| 1,425,754 | 12/1965 | France | 35/26 |
| 2,130,979 | 10/1972 | France | 35/26 |
| 160,043 | 12/1964 | U.S.S.R. | 35/26 |

OTHER PUBLICATIONS

"Relievo Kit", p. 55, Aids and Appliances, Catalog of American Foundation for the Blind, 18th Ed., July 1972 - June 1973.

*Primary Examiner*—Harland S. Skogquist
*Attorney, Agent, or Firm*—Larry Harbin

[57] ABSTRACT

An amusement and instructional coloring book for the blind wherein the images are recessed into pages of the book to form a tactual image outline for defining the area to be colored. Raised border lines may also be provided to demarcate various portions of the image. A legend written in braille and typescript is also provided for defining the colors of the respective portions of the images. The coloring means also have corresponding visual and tactile indices thereon. Other features include means for the blind to appreciate the actual life-size of the images, variable extents of recessions of the image portions for imparting depth perception to the blind, special textures of the images to impart tactual qualities of the real-life images, and the provision of special paper adaptable to be colored completely by feel.

7 Claims, 8 Drawing Figures

COLORING BOOK FOR THE BLIND

BACKGROUND OF THE INVENTION

This invention is related to the art of instructional amusement devices for blind children specifically a coloring book which teaches relative shapes and sizes of objects to be colored.

According to recent statistics, blindness among people may vary from about 0.04% to 4% of the population throughout various parts of the world, but averages approximately 0.042% in most highly developed countries including the United States. Blindness is defined as a visual accuity of less than 20/200 corrected, with the visually impaired persons having a corrected visual accuity between 20/200 and 20/70. Both the blind and visually impaired persons require special attention in the area of education and amusement, the former being a more important consideration for younger children. The prior art is replete with samples of combustion amusement and educational toys, games, or other devices, but all together tend to neglect the special needs of the blind.

A coloring book is considered to provide amusement while at the same time provides the means for children to become closely acquainted with the objects or images to be colored. Consequently, a coloring book has some educational utility in that it teaches the shape, size, color, and natural habitates of various objects and images.

The existence of pictures for the blind is not novel as suggested by U.S. Pat. No. 2523828 issued to Howe on Sept. 26, 1950. In this reference, silhouettes of various objects and images are disposed upon a planar surface and are adaptable to tactual sensation by blind persons. A variation in the thickness of the silhouette may impart three dimensional perceptions.

A coloring book for the blind may be based upon similar principles wherein the outline of an object may be sensed from either raised or recessed images for the purpose of tactually defining the limits of the objects to be colored. A disclosure of a picture to be colored having raised outlines is shown in U.S. Pat. No. 2371153 issued to Connelly on Mar. 13, 1945, although not specifically adapted for use by the blind. Its primary purpose is to provide means for more effectively constraining the limits of the respective colors during the coloring process.

Special problems associated with the blind include the provision of an image together with actual coloring means for coloring the image. Once the image and coloring means are presented, methods for coloring correctly and completely must be provided. Means should also be provided to impart the knowledge of relative size and texture of the object being colored for educational purposes.

In view of the foregoing, the primary objective to be accomplished by the teachings of this invention is to provide a coloring book for the blind which amuses and educates.

Insofar as amusement is concerned, the applicant comments that pleasurable experiences for young children are achieved by the successful performance of a task, namely, the task of coloring the respective counter parts of the object directly and completely.

Regarding the educational aspects and objectives of the invention, it is important to note that because blind persons are unable to become familiar with a great number of objects, their learning process may become somewhat retarded. However, should blind children undergo the exercise of tactually sensing the shapes of the respective objects by coloring within their outlines and borders, the learning deficiency or disability is removed. Consequently, the educational aspects of such a coloring book is enhanced.

Other objectives of the invention may be accomplished by the provision of variations in the surface texture of the object or images to be colored, the provision of a measuring element associated with the image so that relative sizes may be perceived, and the provision of a special coloring surface adaptable to be felt to determine color coverage.

Another object of the invention is to provide a coloring book for the blind having associated coloring means with tactile indicia thereon. It is a further object of the invention to provide a coloring book for the blind wherein the images to be colored have associated therewith visual and tactual color identifying means for the various portions of the images. It is a further object of the invention to provide a coloring book for the blind wherein the respective portions of the images are recessed to an extent in accordance with their three dimensional perceptions.

It is also an object of this invention to provide simplified tactual coding means for determining color of the respective coloring means.

Further objects of the invention will become more readily apparent upon the disclosure to follow herein.

SUMMARY OF THE INVENTION

The disclosure defines a coloring book having pages with recessed images thereon which forms an outline of an object to be colored by blind persons. The color is confined within the borders defined by the recessed image. This border may be tactually sensed with the fingers. Associated with the image are coloring means such as crayons or pencils, having tactual identifying means such as braille or another type of coding scheme. Also associated with the image is an index or key which defines the various portions of the object and their respective colors. The key is annotated in braille and typeset wherein the instructional aid of a visual observer is located during his or her interaction with the blind child. Raised bordering lines are also provided to demarcate the several portions of the object. These raised lines may be sensed by the blind child for the purpose of determining the areas within which the respective colors are too confined.

Other variations of the invention as heretofore described include the provision of a standard measuring element near the image whereby the blind child may more fully appreciate the relative size of the object that is being colored. For instance, a scaled down measuring stick or yard stick may be conveniently associated with the picture so that the child may appreciate the real life size of the object which is being colored. As heretofore mentioned, it is inconvenient to bring into a classroom certain animals or objects for inspection of the child because of their habitat or size or other reasons.

Another variation of the invention includes varying the extent of recession of the several portions of the object in accordance with their actual three dimensional view. In this manner, the child may also gain a better idea or perception of the actual shape of the image.

Various texture qualities may also be added to the image or its respective portions to provide the means for the child to learn the feel of the real life object.

Other objects of the invention will become more readily apparent upon the detailed description hereinafter set forth.

DETAILED DESCRIPTION OF DRAWINGS

FIG. 1A discloses the preferred embodiment of the invention wherein a three dimensional object is impressed on the pages of the coloring book.

Figure 2:
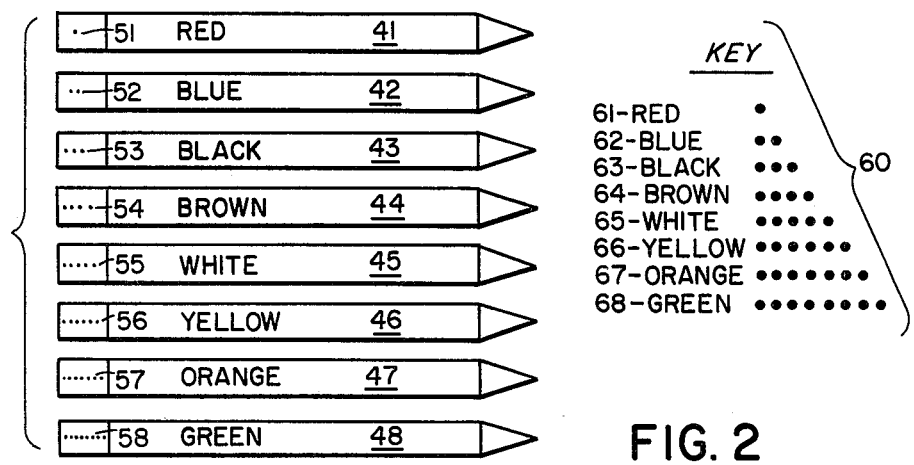

FIG. 2 discloses coloring means having tactile indicia thereon.

Figure 3:
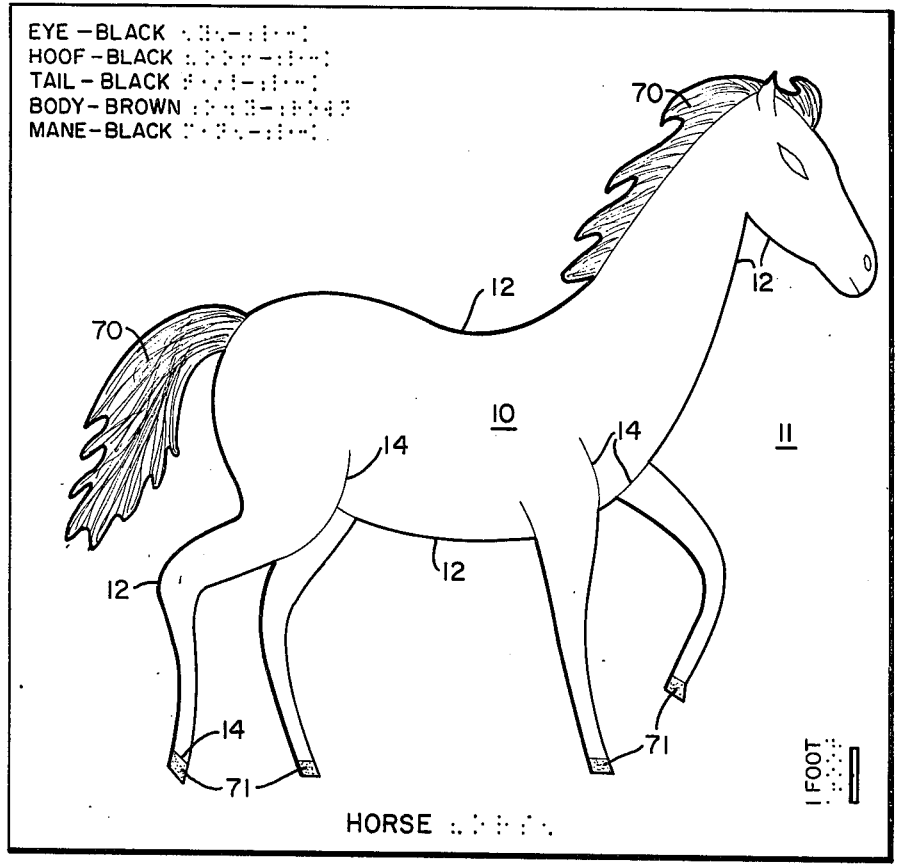

FIG. 3 discloses another embodiment of the invention wherein texture qualities are added to various portions of the image.

Figure 4A:
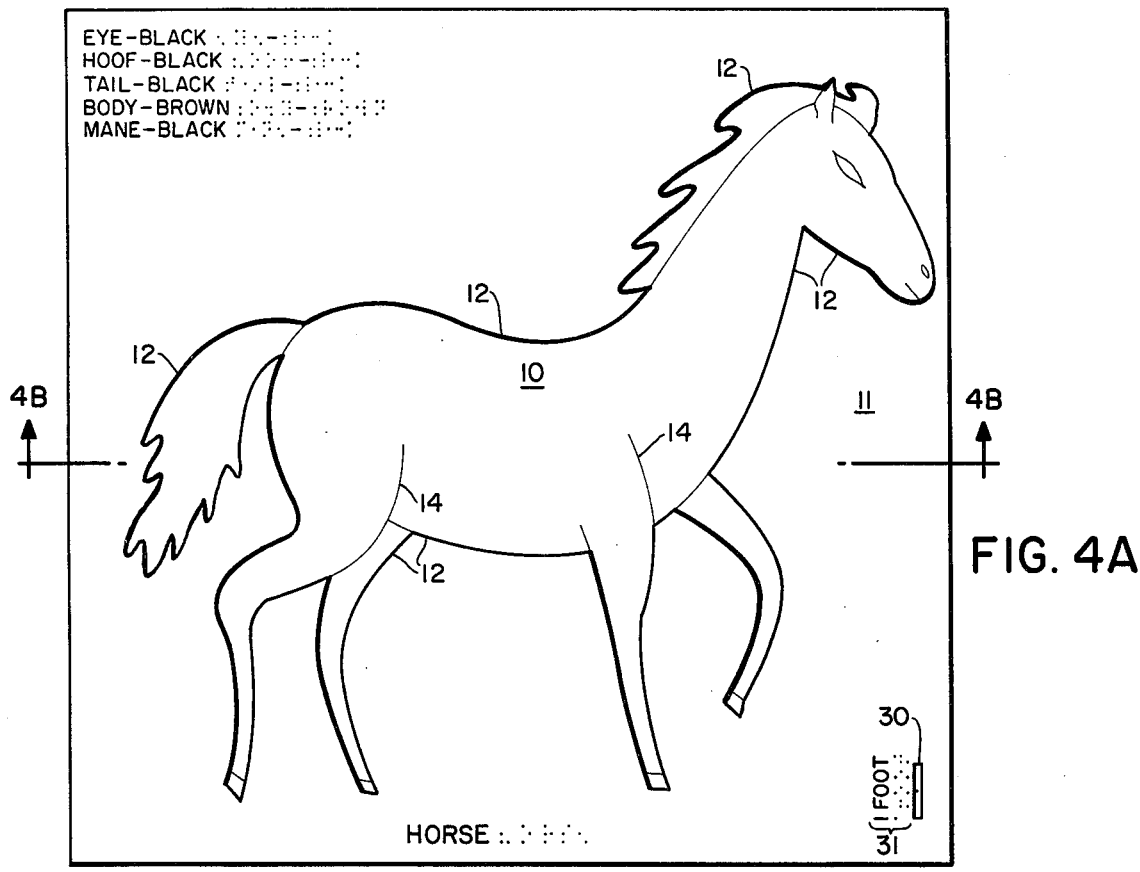

FIG. 4A discloses a more simplified version of the invention wherein a two dimensional object is shown.

Figure 4B:
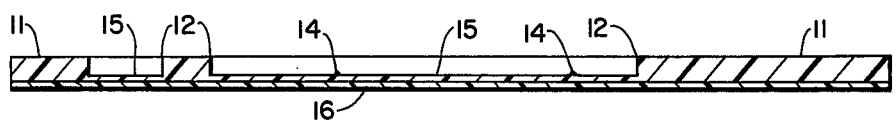

FIG. 4B shows a cross sectional view of FIG. 4A at line 4B—4B.

Figure 5:
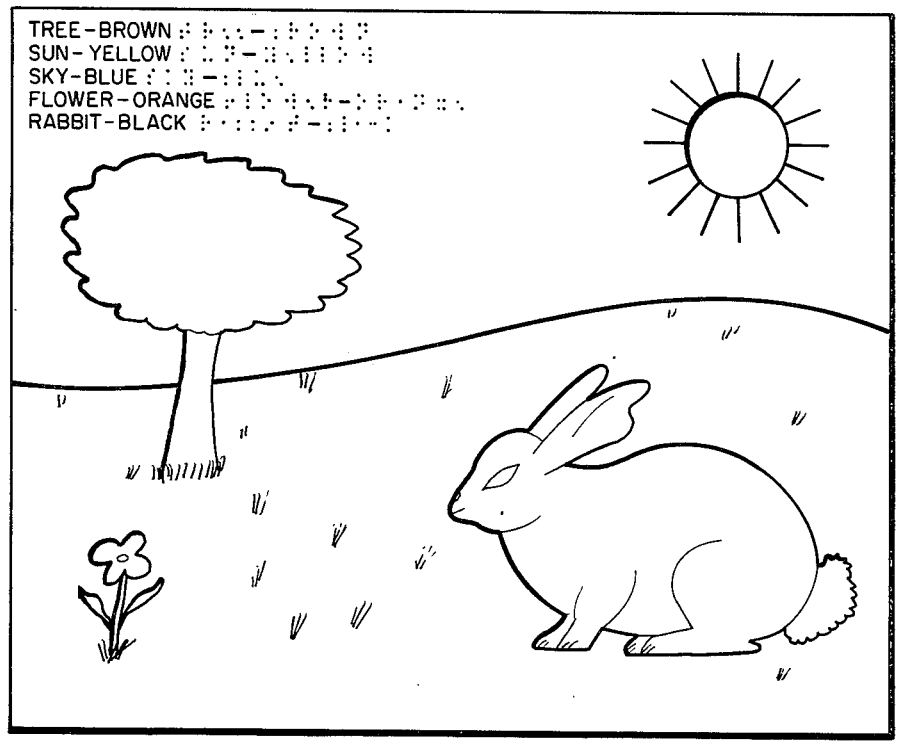

FIG. 5 shows a scene with several objects.

BRIEF DESCRIPTION OF THE INVENTION

Figure 1A:
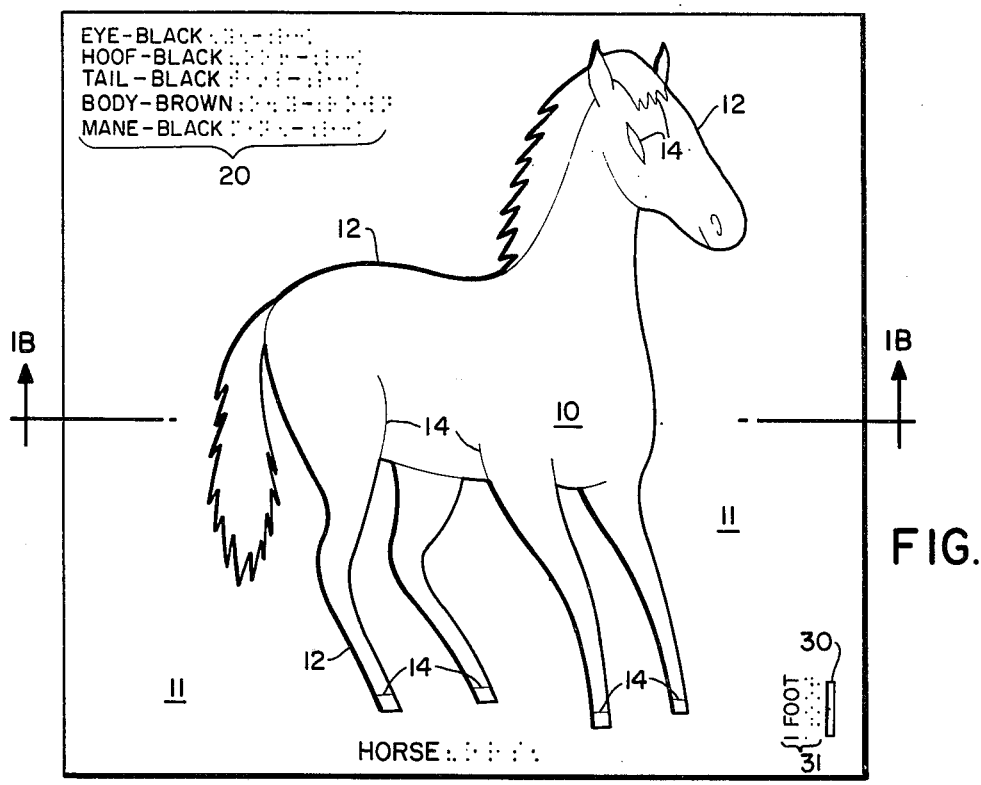
FIG. 1B is a cross sectional view of line 1B—1B of FIG. 1A.
FIG. 1C shows the colored image of FIG. 1A.

Now referring to FIG. 1A of the invention an image 10 is shown impressed into coloring surface 11 wherein bordering line 12 forms the outline of the image. Image 10 is colored by coloring means generally shown in FIG. 2 in accordance with the specifications of coloring key 20 which may be written in typeset or braille within or without sheet 11. For instance, the various components of the image, such as eye 13 is specified to be colored black in key 20. Other portions of the image 10 are colored by coloring means in accordance with the dictates of color key 20.

It should be noted that various portions of the image are demarcated by raised border lines 14 so that the blind person may tactually confine the respective colors within the boundaries. The raised border lines not only separates the various portions, but also depicts other characteristics of the image.

For the purpose of providing the blind with means to determine the relative size of image 10, measuring element 30 is provided and represents a unit measurement of, say, 1 foot. By tactually sensing the measuring element 30 and the definition key 31 associated therewith, the blind may appreciate the size of the image which is being colored.

Sheet 11 is composed of stiff material which, when impressed with a mold of image 10, will retain its shape.

Figure 1B:
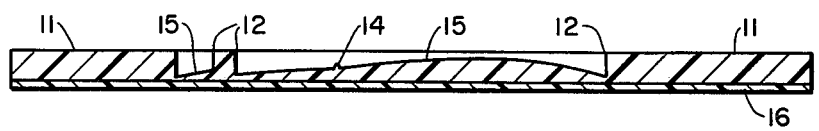
Figure 1C:
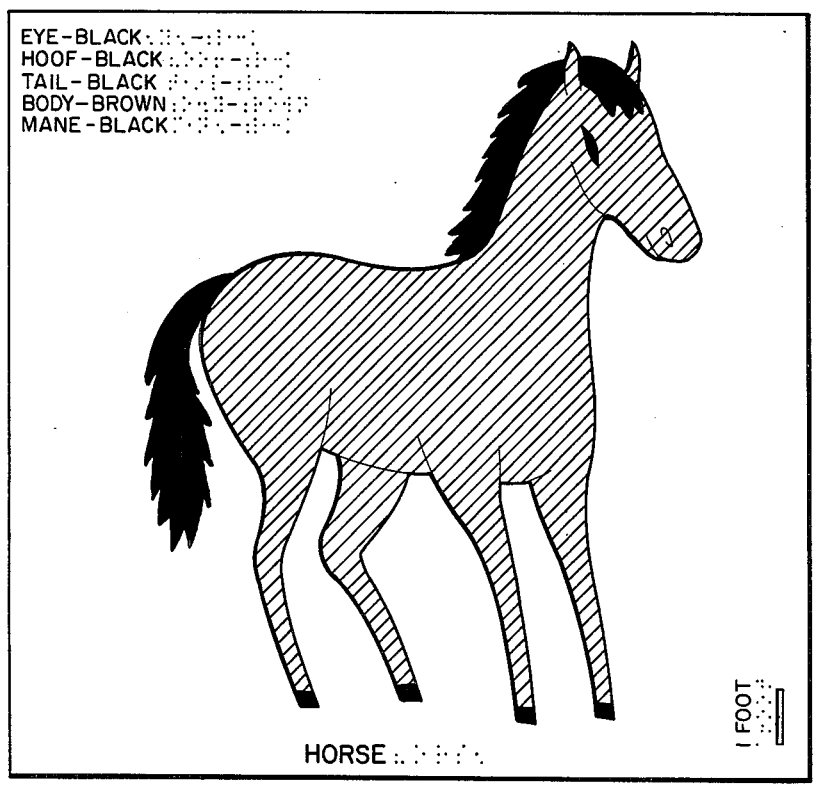

The three dimensional aspects of the image 10 is more fully illustrated by FIG. 1B wherein a cross section of the image 10 at line 1B—1B is shown. Specifically, surface 15 will vary in depth from the planar surface 11 in accordance with the actual three dimensional view of an object illustrated by image 10. The outline 12 of image 10 is more fully illustrated by FIG. 1B, which more fully describes how the outline of the image may be actually sensed by the blind. Also shown in FIG. 1B is a backing sheet 16 which separates the images within the pages of the coloring book, which is not shown. However, it can be appreciated that the backing sheet 16 would be necessary to prevent interference with underlying pages while coloring due to surface irregularities. FIG. 1C shows a completely colored image in accordance with key 20.

Now, referring to FIG. 2 coloring means are shown generally by elements 41 through 48. Tactile indicia means 51 through 58 are disposed on the tips of the coloring means and are adapted to be sensed by the user. It should be noted that the tactile indicia may be disposed at any location on the coloring means 41 through 48 and that they are shown on the tips only for the purpose of illustration. A coding key 60 having respective color codes 61 through 68 is also provided which defines the respective colors of coloring means 41 through 48. The coding means and tactile indicia may very well be coded in braille instead of a series of dots as shown. Any other type of coding means, such as symbols or various crayon or pencil characteristics may also be implemented for the purpose of identifying the respective colors. It is only necessary that the code implied in key 60 correspond to the color key code 20 associated with image 10 of FIG. 1A.

Now, referring to FIG. 3, a modification of the preferred embodiment of the invention is shown wherein texture qualities are shown to be added to image 10. Item 70 illustrates qualities which may be associated with loose hair of the horse shown in image 10. Additional surface qualities of hoofs 71 may also be implied to impart the knowledge of various tactual qualities of the respective images.

Referring to FIG. 4A and 4B, the simplified embodiment of the invention is shown wherein the image is recessed into sheet 11 in two dimensions, instead of three dimensions as shown in the preferred embodiment. FIG. 4B specifically illustrates the manner in which the image impression is made. Surface 15 is shown to be rather flat, only having raised border lines 14 for the purpose of demarcating the various portions of the image 10. FIG. 4B shows a cross section of image 10 at line 4B—4B. Backing sheet 16 is also utilized in the simple embodiment of the invention.

FIG. 5 discloses an invention scene wherein several objects are shown for the purpose of illustrating to the blind the natural habitats of various objects and their respective environment.

It is apparent that many modifications and changes may be made by one skilled in the art to which the subject pertains, however, the applicant states that such modifications and changes can be made without the party from the scope and spirit of the invention as described and claimed herein. It is emphasized that the purpose of the invention is to provide a coloring book for the blind wherein the images may be tactually sensed and colored, the color remaining within border lines formed by the recession and raised border lines within the image. It is also an attempt to provide corresponding coloring means having tactual indicia thereon which corresponds with a coloring key associated with the respective images. By the teachings of this invention, means are provided for amusing young children having visual deficiencies while at the same time teaching them the various sizes and shapes of objects which they would otherwise not be able to examine.

In view of the foregoing, it is the intent of the applicant to include all modifications, adaptations and changes which may be made within the spirit of the invention as stated. Accordingly, in view of the foregoing detailed description and illustrations, what is claimed is:

1. In a coloring book for the blind, a page comprising at least one image thereon having at least one portion to be colored, said image being recessed within the page thereby forming a tactual outline within which the image is to be colored, raised border lines within the outline of the recessed image to tactually demarcate the respective portions of the image, definitive tactile indicia associated with said images for defining the colors of the respective portions of the images, and coloring means having identifying tactile indicia thereon corresponding to the definitive tactile indicia whereby a blind person may select the appropriate color the respective portions of the images in accordance with the definitive tactile indicia.

2. The invention of claim 1 including visual indicia associated with said definitive tactile indicia whereby a visual observer may aid in the instruction of the blind.

3. The invention of claim 1 wherein the extent of recess of the respective portions of the image is varied in accordance with the depth of the respective portion as perceived in three dimensions whereby the blind may more fully appreciate the qualities of the object.

4. The invention of claim 1 where the surface texture of the respective portions of the image are associated with the actual texture of the real life object whereby the blind may more fully appreciate the actual tactual qualities of the real life object.

5. The invention of claim 1 wherein the relative sizes of the images correspond to their true relative real life sizes whereby the blind may more fully appreciate the relative sizes of the real life objects.

6. The invention of claim 1 including a scaled tactual measuring element associated with said images whereby the blind may more fully appreciate the relative sizes of the real life objects.

7. The invention of claim 1 wherein the surface portions of the images are adaptable for tactual determination of color coverage by said coloring means wherein the blind may more efficiently color the entire image.

* * * * *